Figure 1:
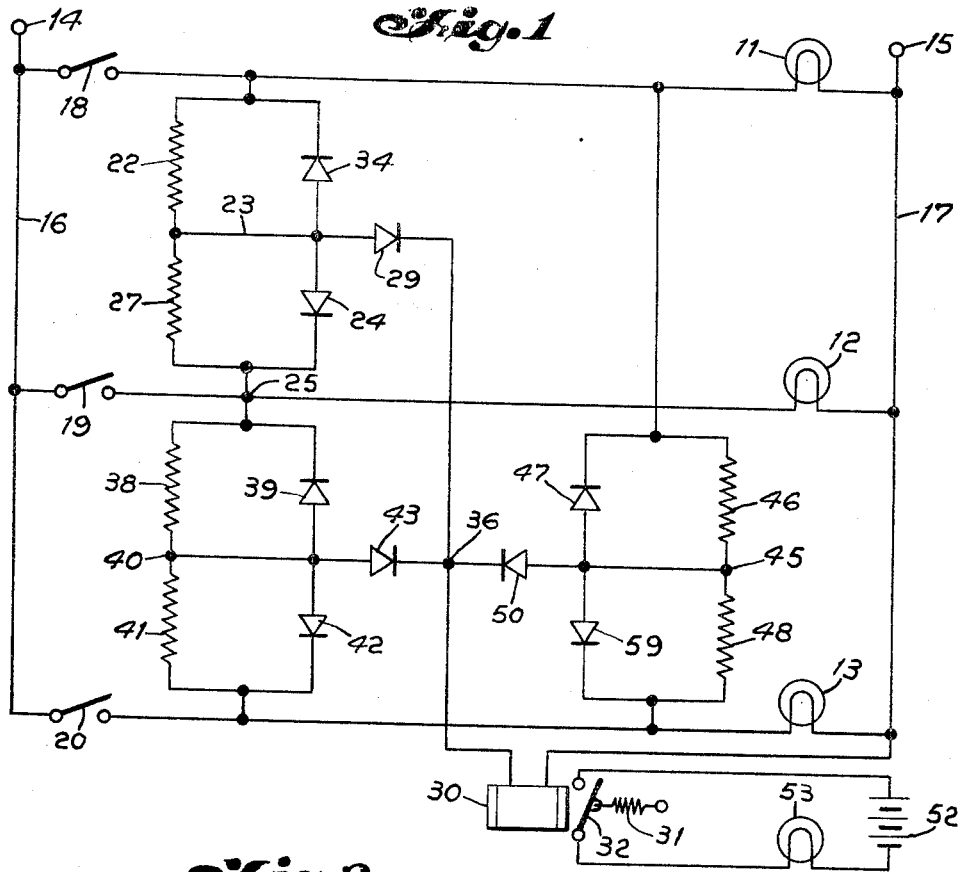

Sept. 6, 1966  R. LUCE  3,271,753
MONITORING CIRCUIT FOR DETECTING CONVERGENCE OF
A PLURALITY OF VOLTAGE LEVELS
Filed Aug. 19, 1963

INVENTOR.
RUDOLF LUCE
BY
Robert L. Cooke
ATTORNEY

United States Patent Office 3,271,753
Patented Sept. 6, 1966

3,271,753
MONITORING CIRCUIT FOR DETECTING CONVERGENCE OF A PLURALITY OF VOLTAGE LEVELS
Rudolf Luce, Ditzingen, Wurttemberg, Germany, assignor to International Standard Electric Corporation, New York, N.Y., a corporation of New York
Filed Aug. 19, 1963, Ser. No. 302,790
Claims priority, application Germany, Aug. 30, 1962, St 19,650
15 Claims. (Cl. 340—248)

This invention relates to a monitoring circuit for detecting the presence of certain electrical conditions in an electrical system.

In particular, this invention relates to a circuit for indicating the convergence or mutual approach of two or more voltage levels in an electrical system, to the end that warning may be given or certain action taken when these voltage levels approach each other sufficiently closely.

Still more particularly, this invention relates to a monitoring circuit which is particularly useful in signalling systems such as the systems employed in operating the signal lights for control of vehicular traffic at an intersection of roads.

In certain signalling systems, it is important to prevent the existence of identical potential levels at a plurality of points in the system. For instance, in systems having more than one indicator or signal light, it is sometimes of vital importance to prevent more than one such light from being displayed at a time. The importance of preventing simultaneous operation of signal lamps is especially obvious in the case of traffic-control lights for the control of vehicular traffic at an intersection of roads. If green lights were to be displayed in such a way as to confront the oncoming traffic on each of the roads which constitute the intersection, it is obvious that a collision would be very likely to ensue.

Ordinarily, when control systems such as traffic-light signalling systems are operating normally, conflicting signals such as green lights displayed in the directions of both roads at an intersection do not occur. However, if a fault should for some reason come into existence in the signalling system, it would be possible for the power lines leading to the signal lamps on both roads at the intersection to be simultaneously energized, thereby displaying green lights to traffic on both roads. In that event, it would be extremely important to have warning of the existence of the fault in order that corrective action might be taken. Alternatively, in cases wherein corrective action must be taken as soon as the fault occurs, without waiting for a warning signal to be acted upon, the corrective system should be made completely automatic. In order to detect and eliminate the energizing potentials which, by occuring on more than one power line simultaneously, could cause the simultaneous and unintended display of two or more green lights, a mutual approach between the voltages appearing on the power lines serving any two of the green lamps should initiate the breaking of the circuit which supplies both the green lamps, thereby immediately and completely removing the source of power necessary to continue the hazardous condition.

A number of different approaches have been taken in order to prevent the display of conflicting traffic signals and, more broadly, to indicate the existance of similar electrical potentials at a plurality of points in complicated electrical systems. One such prior-art approach to the problem of preventing or indicating the existence of conflicting traffic-signal indications has involved the use of a supervisory relay connected in series with each of the signal lamps whose simultaneous operation is to be prevented. That is, a supervisory relay has been installed in series with the green lamp for each road at an intersection. In that type of system the contacts of the supervisory relays are connected in such a way that simultaneous operation of more than one supervisory relay would actuate still another relay, which would then either give an indication of the trouble or automatically initiate steps to eliminate the trouble producing the conflicting display of signals. In that type of prior-art arrangement, an individual supervisory relay is required for each signal lamp, and it becomes necessary to employ a series connection of the respective contacts operated by the supervisory relays. In the case of a complicated intersection of roads, with a substantial number of signal lights, this type of arrangement necessitates a series connection of a substantial number of relay-operated contacts. Enlargement or revision of the traffic-signal system then becomes costly and difficult with this type of arrangement. Moreover, this approach involves the use of a large number of series-connected relays, which may themselves become the source of the same kind of trouble which caused the fault in the signal system.

In another approach to the solution of the problem of prevention of conflicting indications by traffic-signal lamps, supervisory switching means are provided in the circuit with each lamp, these supervisory switching means being controlled by the respective circuits of the other lamps whose simultaneous operation must be prevented. In this type of system, the operation of any signal lamp is supposed to prevent the operation of all other signal lamps with which it would conflict. However, once again, this type of system entails considerable cost and difficulty when modification of the system is to be made.

In still other approaches to the solution of the problem of conflicting traffic signals, the apparatus involves the use of a plurality of relays, and is bulky, costly, or inconvenient to modify.

Accordingly, it is an object of my invention to provide a monitoring circuit capable of detecting and indicating the mutual approach of two electrical potentials at certain respective points in an electrical system.

It is another object of my invention to provide a monitoring circuit which affords a fool-proof means for detecting or preventing the existence of conflicting signals in a vehicular-traffic-control system.

It is still another object of my invention to provide, for the above-described purposes, a monitoring circuit which is compact, relatively inexpensive, and easy to modify, should modification be required.

Figure 2:
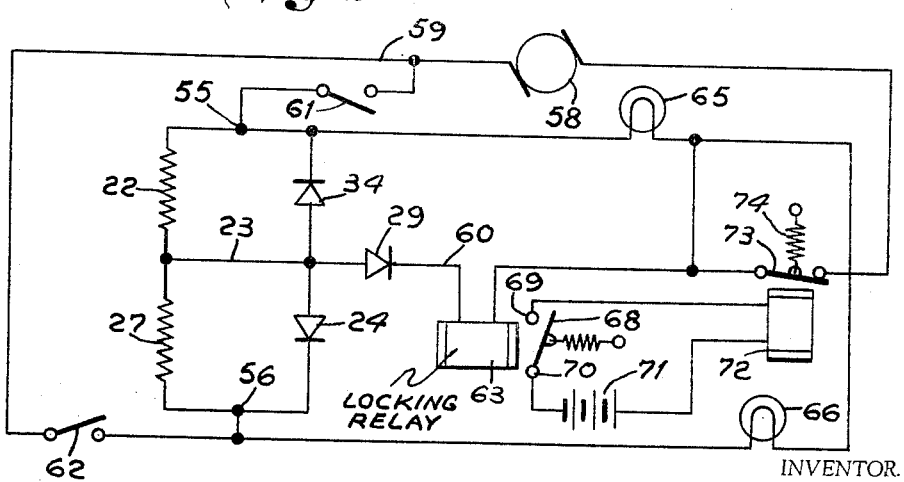

Briefly, I have fulfilled these and other objects of my invention by use of a network of impedances and current-control devices connected between every two of a plurality of power lines serving the various respective signal lamps whose simultaneous illumination is to be prevented. Each of these networks is connected through further current-control means to operate a utilization device, such as a relay, upon occurrence of the condition which is to be detected. The utilization device may then take any corrective action which is desirable in the circumstances. In a typical embodiment of my invention, the current-control means to which reference has been made take the form of rectifiers having a suitable polarity of connection. For a full understanding of my invention, reference should now be made to the following detailed specification, taken in conjunction with the drawings, wherein:

FIGURE 1 is a schematic diagram of a monitoring circuit providing for operation of a warning light or other device in the event that the power lines serving any two of three traffic-control lamps become simultaneously energized; and FIGURE 2 is a schematic diagram of a monitoring circuit, employing the principles of my invention, which operates a circuit breaker to cut off the flow of power to a signal-lamp circuit whenever the electrical potentials at two particular nodes in that circuit approach sufficiently closely to each other.

Turning to FIGURE 1 of the drawings, we find a monitoring circuit for monitoring the currents and electrical potentials supplied to a plurality of loads such as incandescent signal lamps 11, 12, and 13. Incandescent signal lamps 11, 12, and 13 might, for instance, be the green signal lamps confronting the automobiles approaching the intersection of three respective roads, the intersection being such as to make it important to permit traffic to enter the intersection from only one of the three roads at a time. It will be understood that, although a traffic-signal system is one of the most important types of application of this invention, the principles of the invention may also be applied in the monitoring of the electric circuits supplying other types of loads. These loads, of whatever type, may be supplied from a pair of voltage sources connected so as to apply a potential difference between a terminal 14 and a terminal 15. The first source, connected to terminal 14, energizes a first conductor 16, while the second source, connected to terminal 15, energizes a second conductor 17. One terminal of signal lamp 11 is connected to conductor 17, while the other terminal of signal lamp 11 is connected through a switch 18 to conductor 16. Switch 18, or some similar switching means, may be actuated by the traffic-control timing system which provides for the cyclical display of the signal lights at a particular intersection. Alternatively, switch 18 may be a hand-operated switch or other device for controlling the energization of signal lamp 11.

As shown in FIGURE 1 of the drawings, one terminal of signal lamp 12 is connected to conductor 17, while the other terminal of signal lamp 12 is connected to conductor 16 through a switch 19. This connection of signal lamp 12 is analogous to the connection of signal lamp 11, and statements may be made about switch 19 similar to the statements made, in the foregoing paragraph, about switch 18.

Again, one terminal of signal lamp 13 is connected to conductor 17, while the other terminal of signal lamp 13 is connected to conductor 16 through a switch 20. Once again, switch 20 may be any type of switching means, operated automatically or manually, for causing the energization of signal lamp 13. In view of the initial assumption that only one of signal lamps 11, 12, and 13 is to be energized at a time, it is important for only one of switches 18, 19, and 20 to be closed at any given time.

Let us assume that conductors 16 and 17 have been energized by impressing an alternating voltage between them, and that switch 18 has been closed, thus energizing signal lamp 11. Let us assume further that it is desired not to have signal lamp 12 and signal lamp 13 lighted concurrently with signal lamp 11 and that, hence, switch 19 and switch 20 are open. Let us assume still further that there are no faults in the supply lines and that operation of the traffic-control system is normal.

Under the assumed circumstances, the appearance of the positive voltage half wave at conductor 16 will cause current to flow through switch 18 and through signal lamp 11 to conductor 17. It will also cause current to flow through switch 18 and an impedance 22 to a node 23. From node 23, there is essentially a pair of parallel paths in which substantial flow of current will take place. The first such parallel path leads from node 23 through a rectifier 24 to a node 25 and thence through signal lamp 12 to conductor 17. In place of rectifier 24, it would be possible to use another type of current-control means, so long as the voltage drop therethrough is small. It will be noted that rectifier 24 is shunted by an impedance 27, through which the current flow will be small during the positive half cycle of the alternating voltage wave. For impedance 22 and impedance 27, I prefer to employ resistors. However, it would be possible to employ other impedance devices having substantial resistance.

Under the circumstances which have been described, signal lamp 12 is effectively connected in series with impedance 22 and rectifier 24 between conductors 16 and 17. The current which flows through signal lamp 12 under these circumstances is small. In fact, the current which flows in signal lamp 12 will be assumed to be so small that signal lamp 12 does not light up to such an extent as to produce a display conflicting with signal lamp 11. In the monitoring circuit according to my invention, the choice of the voltage applied between conductors 16 and 17, the choice of impedance 22, and the choice of signal lamps must be such that this assumption is substantiated. Stating this fact in another way, when a signal lamp is intended not to be in operation, we can still tolerate the flow of a certain amount of current through the signal lamp, so long as the current flow does not exceed a threshold value at which point the illumination of the signal lamp becomes perceptible. If other types of loads are used in place of the signal lamps, it must be possible to make a similar type of assumption.

For the purpose of this explanation, we have thus far assumed the application of the *positive* half cycle of an alternating voltage wave to terminal 14 of the monitoring circuit according to my invention. Later in this specification, we shall consider what takes place upon the application of the *negative* half wave of the voltage cycle to terminal 14 of the monitoring circuit. Operation of the monitoring circuit by means of a *direct* voltage would also be possible, so long as the polarity chosen for the direct voltage is consistent with the polarity of the rectifiers which control current flow through the output device of the monitoring circuit.

We have shown how the current flowing through impedance 22 to node 23 divides at that point, part of such current flowing on through rectifier 24 to node 25 and thence through signal lamp 12 to conductor 17. We have also pointed out that there may be a small current flow through impedance 27 to node 25 and then through signal lamp 12 to conductor 17. The other principal component of the current arriving at node 23 flows through a rectifier 29 and a utilization device 30 to conductor 17. The polarity of connection of rectifier 29 is such as to permit the flow of current in this direction. Under the circumstances which have been assumed, with small current flow through signal lamp 12 or signal lamp 13, the flow of current through rectifier 29 and through utilization device 30 is not sufficient to cause the actuation of utilization device 30. Thus we must assume that utilization device 30 has a threshold of operation, and that utilization device 30 will not be actuated until the current flowing therein reaches this threshold. In the preferred embodiment of my invention, utilization device 30 is a relay which is unable to close its armature until the flow of current in the relay is sufficient to produce a magnetic pull capable of overcoming a force of a spring 31 which restrains motion of the armature 32.

To recapitulate, if it is desired to have signal lamp 11 in operation, and if the monitoring circuit is operating normally, application of a positive half cycle of voltage to conductor 16 will result in current flow through signal lamp 12 which is insufficient to light up the signal lamp perceptibly, and will further result in current flow through utilization device 30 which is insufficient to cause operation of the utilization device. The impedance of the electrical path through signal lamp 12 is such as to draw an amount of current insufficient to illuminate signal lamp 12 perceptibly but sufficient to cause a voltage drop across impedance 22 that is great enough to leave too small a voltage available to produce a current through utilization device 30 that is capable of actuating the utilization device.

If we continue to assume normal operation of the monitoring circuit, with no faults on the power lines, the application of the negative half wave of the voltage cycle to conductor 16 will bring about the following consequences:

(1) Signal lamp 11 will be illuminated.

(2) There will be a flow of current through signal lamp 12 through impedance 27, and through a rectifier 34 to switch 18 and thence to conductor 16. This flow of current, because of the nature of impedance 27, will be too small to cause the perceptible illumination of signal lamp 12.

(3) In the same manner there will be a flow of current through signal lamp 13 through impedance 48, and through a rectifier 47 to switch 18 and thence to conductor 16. This flow of current, because of the nature of impedance 48, will be too small to cause the perceptible illumination of signal lamp 13.

(4) There will be *no* flow of current through utilization device 30 and through rectifier 29 to node 23 because of the polarity of connection of rectifier 29.

Thus, during the *negative* half cycle of the voltage wave applied between conductor 16 and conductor 17, as during the *positive* half cycle of this voltage wave, signal lamp 11 is illuminated, signal lamp 12 is *not* illuminated, and utilization device 30 is not actuated.

The foregoing explanation shows that, so long as only one of the switches is closed, and so long as there is no fault in the lines supplying the signal lamps, only one of the signal lamps is perceptibly illuminated, and the utilization device 30, such as a relay, does not become actuated. An analogous type of situation would exist if one of the switches other than switch 18 were closed, rather than switch 18. That is, if switch 19, rather than switch 18, were closed, signal lamp 12 would be illuminated, neither signal lamp 11 nor signal lamp 13 would be perceptibly illuminated, and utilization device 30 would not be actuated so long as there is no fault in the power lines supplying the signal lamps. In a completely analogous manner, if switch 20 were closed, while switch 18 and switch 19 remained open, signal lamp 13 would be illuminated, while signal lamp 11 and signal lamp 12 would not be perceptibly illuminated, and the utilization device 30 would not be actuated unless there were a fault in the power lines supplying the signal lamps.

It will be noted that the networks of this monitoring circuit are completely symmetrical in that the network of impedances and rectifiers by which signal lamp 11 is connected to signal lamp 12 has a counterpart in the network of impedances and rectifiers by which signal lamp 12 is connected to signal lamp 13. Likewise, the network by which signal lamp 12 is connected to signal lamp 13 has a similar counterpart in the network by which signal lamp 13 is connected to signal lamp 11. For optimum operation of this monitoring circuit, each of the signal lamps (or other loads) should be connected to each of the other lamps (or loads) by a network of this type, the outputs of which are brought together at a node 36 and thence are led to the utilization device 30. For the sake of completeness, it may be pointed out that one terminal of signal lamp 12 is connected through the parallel combination of an impedance 38 and a rectifier 39 (or other current-control device) to a node 40, which is in turn connected to one terminal of signal lamp 13 through the parallel combination of an impedance 41 and a rectifier 42 (or other current-control device). Node 40 is connected to node 36 through a rectifier 43.

In a completely analogous manner, one terminal of signal lamp 11 is connected to a node 45 through the parallel combination of an impedance 46 and a rectifier 47. Node 45 is in turn connected to one terminal of signal lamp 13 through the parallel combination of an impedance 48 and a rectifier 49. Once again, the impedances mentioned should be such as to have a substantial component of resistance. Node 45 is connected to node 36 through a rectifier 50.

It is of interest that, in the networks which have been described, the polarity of connection of the rectifiers is identical with respect to node 23, node 40, and node 45. That is, the rectifiers are all poled in such a way as to conduct current *away from* all three of these nodes. The symmetry of the situation makes it apparent that, if desired, the rectifiers might have a polarity of connection such that they all conduct current *toward* these respective nodes rather than away from the nodes, so long as the polarity of connection of the rectifiers is consistent (that is, either all *toward* the respective nodes or all *away from* the respective nodes).

The foregoing paragraphs have presented a detailed discussion of the operation of the monitoring circuit according to my invention *so long as operation is normal*, that is, so long as only one switch is closed and there is no fault in the power lines. The operation of the monitoring circuit *in case of the occurrence of trouble* will now be described.

If, for instance, switch 18 and switch 19 should simultaneously become closed, or if a short circuit should occur across switch 19, the potential at node 25 would be substantially that of conductor 16. Assuming identity of potential at node 25 and conductor 16, on the positive half cycle of the voltage wave, a current will flow through impedance 22 to node 23, while a similar current will flow from node 25 through impedance 27 to node 23. Impedance 22 and impedance 27 thus are connected essentially in parallel. The combined currents arriving at node 23 now flow through rectifier 29 and utilization device 30 to conductor 17. Thus, the equivalent circuit is that of utilization device 30 connected in series with rectifier 29 and with *one-half* of impedance 22 or 27, this series circuit being directly across the power lines. It is to be noted that utilization device 30 and rectifier 29 are *not* now shunted by current flow through the low-impedance path of one of the signal lamps. Under these conditions, the voltage available across rectifier 29 and utilization device 30 is sufficient to cause current flow adequate to actuate utilization device 30, whereupon armature 32 is closed, against the restraining force of spring 31. Thus, the threshold current value has been exceeded, permitting operation of utilization device 30. This situation is in contradistinction to the situation which prevailed when utilization device 30 and rectifier 29 were effectively connected in parallel with rectifier 24 and signal lamp 12, at which time the current flow through signal lamp 12 was such as to cause a voltage drop in impedance 22 that was great enough to leave insufficient voltage available to cause actuation of utilization device 30.

Upon closing of the armature 32 of utilization device 30, a series circuit is closed by which a source 52 may supply current adequate to illuminate a warning lamp 53, or to operate some other warning device, or to open the main power line, thereby de-energizing all the signal-lamp circuits. If desired, utilization device 30 may be a quick-acting relay having inertia low enough to permit closure of armature 32 within the time occupied by the positive half cycle of the applied voltage wave. If closure of armature 32 is not completed during the first positive half cycle of the voltage wave, a subsequent positive half cycle will complete the closure and the operation of the utilization device. It will be understood that the polarity of rectifier 29 is such that current flow does not take place through the utilization device, in the configuration shown in FIGURE 1, during the negative half cycles of the applied voltage wave.

The foregoing paragraphs have described a monitoring circuit as particularly adapted for use in connection with a traffic-signal-lamp system such as might be employed at the intersections of three roads. It will be understood that this illustration does not limit the generality of the invention, and that this type of monitoring circuit may be applied to traffic-signal-lamp systems having any number of signal lamps, corresponding to any number of intersecting roads, so long as the power line supplying each such signal lamp is connected, through a network such as has been described, to the power line supplying every other respective signal lamp of the system, each such network being in turn connected to the utilization device, which is the output device of the monitoring circuit. Indeed, as has been pointed out, the applicability of this type of monitoring circuit is not limited to traffic-signal-lamp systems, but may be extended to a great many different types of electrical systems wherein it is desirable to be able to detect the convergence or mutual approach of two voltage levels. The general utility of the network of impedances and current-control devices is illustrated in FIGURE 2 of the drawings.

In FIGURE 2 of the drawings, there is illustrated a monitoring circuit which employs just one of the networks similar to the three such networks illustrated in FIGURE 1. The components of the network, which have been given reference numerals identical to those of one of the networks of FIGURE 1, are the parallel combination of an impedance 22, and a rectifier 34, this combination being connected in series through a node 23 to the parallel combination of another impedance 27 and another rectifier 24. These parallel combinations of circuit elements are connected in series between a terminal 55 and a terminal 56, the respective potentials of which are to be sensed.

Power for operation of the circuit comes from a source 58, which makes its power available to the network through a conductor 59 and a conductor 60. Node 23 is connected to conductor 60 through a rectifier 29, as in the network previously described. Terminal 55 may be electrically connected to conductor 59 by means of a switch 61, while terminal 56 may be electrically connected to conductor 59 by means of a switch 62. The monitoring circuit of FIGURE 2 is designed to sense and deal with the condition which would exist if both switches 61 and 62 should become simultaneously closed, thereby impressing upon terminal 55 and terminal 56 a potential substantially equal to that of conductor 59. Source 58 may be either an alternating-current generator, or a direct-current generator having a polarity such that current flow from source 58 and conductor 59 can take place through rectifier 29.

If switch 61 and switch 62 do not become simultaneously closed, and if the respective potentials at terminal 55 and terminal 56 do not approach each other, there is only a small flow of current from node 23 to source 58 through rectifier 29, conductor 60, and through a locking relay 63. This flow of current through locking relay 63 is insufficient to exceed the threshold value required for actuation of the locking relay. The flow of current through the branch comprising rectifier 29 and locking relay 63 is small because this branch is shunted by a low-impedance path comprising the series connection of either rectifier 34 and a load 65, or rectifier 24 and a load 66. If *switch 61* is closed so that there is substantial current flow through load 65, there will be small currents through locking relay 63 and through load 66, respectively. The small currents flowing through locking relay 63 and through load 66 will be insufficient to actuate locking relay 63 or to illuminate load 66. On the other hand, if *switch 62* is closed, while switch 61 is open, there is substantial current flow through load 66, while there will be only small currents through locking relay 63 and through load 65. Again, these respective currents will be too small to actuate locking relay 63 or to illuminate load 65.

Now, however, if switch 61 and switch 62 should become simultaneously closed, or if some other circumstance should cause the respective voltage levels at terminal 55 and terminal 56 to approach each other, the result would be to cause impedance 22 and impedance 27 to be effectively placed in parallel with each other, and for current to flow through this parallel combination of impedances, to node 23 and thence through rectifier 29 and locking relay 63. Under these circumstances, the series combination of rectifier 29 and locking relay 63 is not shunted by a low-impedance path comprising one of the loads. Hence, the current level in locking relay 63 becomes sufficient to exceed the threshold value required for actuation of the locking relay, thereby causing an armature 68 to be closed, making contact between terminals 69 and 70. When terminal 69 and terminal 70 become electrically connected, a source 71 then causes the actuation of a circuit-interrupting device 72 having an armature 73. Actuation of circuit interrupting device 72, thereby opening armature 73 against the restraining force of its biasing spring 74, opens the circuit through source 58 and cuts off all power to load 65 and load 66. The power remains cut off until the monitoring circuit is reset, because locking relay 63 retains armature 68 in a closed position even after interruption of the main power circuit through source 58. Maintenance of armature 68 in a closed position between terminals 69 and 70 insures that source 71 will cause circuit-interrupting device 72 to retain armature 73 in an open condition until closure of the main power circuit is intentionally accomplished.

It will be understood that the protective circuit comprising locking relay 63 and circuit-interrupting device 72 serves principally to illustrate the type of practical output device which may be operated by the monitoring circuit according to my invention. Many variations may be made in the output device, depending upon whether interruption of a circuit is required or whether a simple indication of trouble is sufficient for the satisfactory performance of the monitoring circuit. It may be pointed out, still further, that the utility of the network which has been described is not restricted to circuits for the indication or correction of trouble. Rather, this utility is much more general, in that a network of this type may be employed whenever the potential level at terminal 55 and the potential level at terminal 56 approach each other sufficiently closely to permit the current flow through rectifier 29 and through the utilization device to exceed the threshold value required for operation of the utilization device, whatever it may be. Thus, depending upon the choice of the utilization device and of the loads, the monitoring circuit according to my invention has wide utility in detecting and indicating the convergence or mutual approach of two voltage levels until the difference between them becomes less than a predetermined amount. In view of the wide utility of this monitoring circuit and of the networks which comprise it, I wish to have it understood that the scope of my invention is limited only by the appended claims.

I claim:
1. A monitoring system comprising a first voltage source, a second voltage source, a plurality of loads, a first terminal of a first one of said loads being connected through switching means to said first voltage source, a second terminal of said first one of said loads being connected to said second voltage source, a first terminal of a second one of said loads being connected through switching means to said first voltage source, a second terminal of said second one of said loads being connected to said second voltage source, and a conductive path from said first terminal of said first load to said second voltage source, said conductive path comprising an impedance in series with a parallel combination of branches, a first one of said branches including first current-control means in series with a utilization device, and a second one of said branches including second current-control means connected to said first terminal of said second one of said loads, said second current control means being shunted by an impedance.

2. A monitoring system in accordance with claim 1, in which said current-control means are rectifiers.

3. A monitoring system in accordance with claim 1, in which said loads are lamps.

4. A monitoring system in accordance with claim 1, in which said utilization device is an electromagnetic relay.

5. A monitoring system in accordance with claim 1, in which said impedances are characterized by finite resistance components.

6. A monitoring system in accordance with claim 1, in which said utilization device is a locking relay.

7. A monitoring system in accordance with claim 1, in which said utilization device includes a relay for actuation of a warning lamp.

8. A monitoring system in accordance with claim 1, in which said utilization device includes a locking relay and means responsive to said locking relay for interrupting the electrical circuit of said first voltage source and said second voltage source.

9. A monitoring circuit comprising a first power line, a second power line, a plurality of lamps, and control means having two terminals, a first terminal of each of said lamps being connected through electrical conductor and through switching means to said first power line, a second terminal of each of said lamps being connected through electrical conductor to said second power line, said first terminal of each of said lamps being connected to said first terminal of each other one of said plurality of lamps through a network, each said network comprising a series connection of two combinations of circuit elements, each said combination of circuit elements comprising an impedance and a rectifier connected in parallel, the two said combinations of circuit elements included in each network being connected together through a node, each such node being connected through a rectifier and an electrical conductor to a first terminal of said control means, a second terminal of said control means being connected through an electrical conductor to said second power line, and the polarity of each of said rectifiers being identical with respect to the respective node to which it is connected.

10. A monitoring circuit in accordance with claim 9, in which the number of said lamps is three and the number of said networks is three.

11. A monitoring circuit in accordance with claim 9, in which said control means is a relay for operating a switch to de-energize at least one of said power lines.

12. A monitoring circuit in accordance with claim 9, in which said control means is a relay for turning on a warning light.

13. A monitoring circuit in accordance with claim 9, in which said control means is a circuit breaker for de-energizing at least one of said power lines.

14. A monitoring circuit in accordance with claim 9, in which said control means requires for its operation a finite threshold current.

15. A circuit for indicating the convergence of a first electrical potential and a second electrical potential, comprising a first terminal for application of said first electrical potential, a second terminal for application of said second electrical potential, a third terminal for application of a third electrical potential, a first parallel combination of an impedance and a rectifier connected between said first terminal and a node, a second parallel combination of an impedance and a rectifier connected between said second terminal and said node, and a relay having an actuating coil and adapted to be actuated upon attainment of a threshold value by an electric current flowing through said actuating coil, one end of said actuating coil being connected to said third terminal, and the other end of said actuating coil being connected through a rectifier to said node, the polarities of all of said rectifiers with respect to said node being identical.

No references cited.

NEIL C. READ, *Primary Examiner.*

D. MYER, *Assistant Examiner.*